United States Patent [19]

Devore et al.

[11] 3,790,954

[45] Feb. 5, 1974

[54] SKEW CONTROLLED READBACK SYSTEMS

[75] Inventors: Ernest W. Devore, Boulder; John W. Irwin, Loveland, both of Colo.

[73] Assignee: International Business Machines Corporation, Armonk, N.Y.

[22] Filed: Dec. 26, 1972

[21] Appl. No.: 317,985

[52] U.S. Cl. .................... 340/146.1 F, 340/174.1 B

[51] Int. Cl. .................... G06k 5/04, G11b 27/36

[58] Field of Search ................ 340/146.1 F, 174.1 B

[56] References Cited

UNITED STATES PATENTS 3,456,237 7/1969 Collins .......................... 340/146.1 F

*Primary Examiner*—Felix D. Gruber

*Assistant Examiner*—R. Stephen Dildine, Jr.

*Attorney, Agent, or Firm*—Herbert F. Somermeyer

[57] ABSTRACT

Marginal skew in a readback system of a digital multitrack magnetic signal recorder selectively actuates a gating system for selectively passing control signals for effecting control functions in signal processing circuits. The control function may include a mode change of handling readback signals, for example, initiating deadtracking operations even though apparent successful readback is occurring.

15 Claims, 7 Drawing Figures

SKEW CONTROLLED READBACK SYSTEMS

DOCUMENTS INCORPORATED BY REFERENCE

Miller U.S. Pat. No. 3,262,097, a deadtracking system.

Floros U.S. Pat. No. Re. 25,527, a deskewing system.

Morphet U.S. Pat. No. 3,154,762, detection of excessive skew using the Floros deskewing apparatus, for example.

Hinz, Jr., U.S. Pat. No. 3,639,900 for an error correction code using pointer or quality signals in connection with error correction activities.

Brown U.S. Pat. No. 3,508,194 for an error correction and detection system.

Bossen U.S. Pat. No. 3,629,824 for an error correction system.

Irwin U.S. Pat. No. 3,641,534 for a digital signal recorder.

Irwin U.S. Pat. No. 3,654,617 for an I/O controller in which the present invention may be incorporated.

BACKGROUND OF THE INVENTION

The present invention relates to digital data recorders and more particularly to readback portions thereof which utilize skew-indicating signals as a control element.

Present-day readback systems for magnetic digital recorders usually employ self-clocking readback circuits such as shown by Seader in U.S. Pat. No. 2,864,078, as well as many other patent references. Such self-clocked readback, in the respective tracks of a plural track magnetic recorder, is asynchronous; that is, the signals from one track may appear at the transducer time displaced from each and every other signal from the other tracks. Accordingly, in accordance with the Floros patent, supra, the asynchronous read back signals are supplied to a deskewing apparatus and realigned for retransmittal as parallel bytes or frames of data signals. According to the Morphet patent, supra, the dynamic skew of a readback transport may exceed the capability of the deskewing apparatus shown by Floros. Morphet, then, indicates that an error condition has occurred by indicating excessive skew.

Excessive skew indicates a nonrecoverable error during a given reading pass. Accordingly, a retry is effected; that is, after the record block has been scanned, the tape is stopped and transported in the reverse direction for a so-called read backward operation in order to successfully recover the recorded signal. However, excessive skew conditions are not always caused by the actual dynamic skewing of the tape as it is transported past the multitrack scanning transducer. Circuit errors, low signal quality, and other factors may influence the skew condition of a readback system. These factors may result in more or fewer signals being supplied from a given track than from other tracks. This action makes the given track signals appear increasingly leading or lagging behind signals from other tracks until excessive skew may be encountered.

On the other hand, it is desirable to maximize the throughput of magnetic digital recorders, particularly those connectable to data processing systems. If the excessive skew condition could be avoided, particularly under those situations where the skew condition is caused by a factor other than the actual excessive dynamic skew of the tape, then the throughput and also the reliability of a digital recorder can be enhanced.

SUMMARY OF THE INVENTION

It is an object of the invention to provide a multitrack readback system for a digital magnetic recorder with increased insensitivity to skew conditions caused by factors other than the actual excessive skewing of tape transport.

In accordance with the invention, deskewing operations of a deskewing apparatus in a multitrack digital signal readback system for a magnetic recorder include a monitor for monitoring count differences between the input signals as associated with respect to storage registers in the deskewing apparatus and the output count indicating the last register having a realigned frame of data signals. When a threshold is exceeded, which threshold is preferably less than that indicating excessive skew, control means are activated for effecting a function in the signal processing circuits which receive realigned signals from the deskewing apparatus, in the deskewing apparatus itself, and selectively in the input signal portions supplying signals to such deskewing apparatus.

In a preferred form, the change is a mode control which eliminates signals associated with tracks yielding error conditions. In the most preferred form, any signal exceeding the threshold activates the control means to selectively change the mode of operation in any readback channel associated with respect to record tracks that have predetermined error conditions.

In a specific form of the invention, the mode control effects deadtracking operations in those readback channels exhibiting excessive error conditions. An excessive error condition is defined as an error condition which is persistent over a given number of signal positions in the respective record tracks. The threshold is conveniently termed "marginal skew" (MARG SKEW).

The foregoing and other objects, features and advantages of the invention will be apparent from the following more particular description of preferred embodiments of the invention, as illustrated in the accompanying drawing.

THE DRAWING

DETAILED DESCRIPTION

Figure 1:
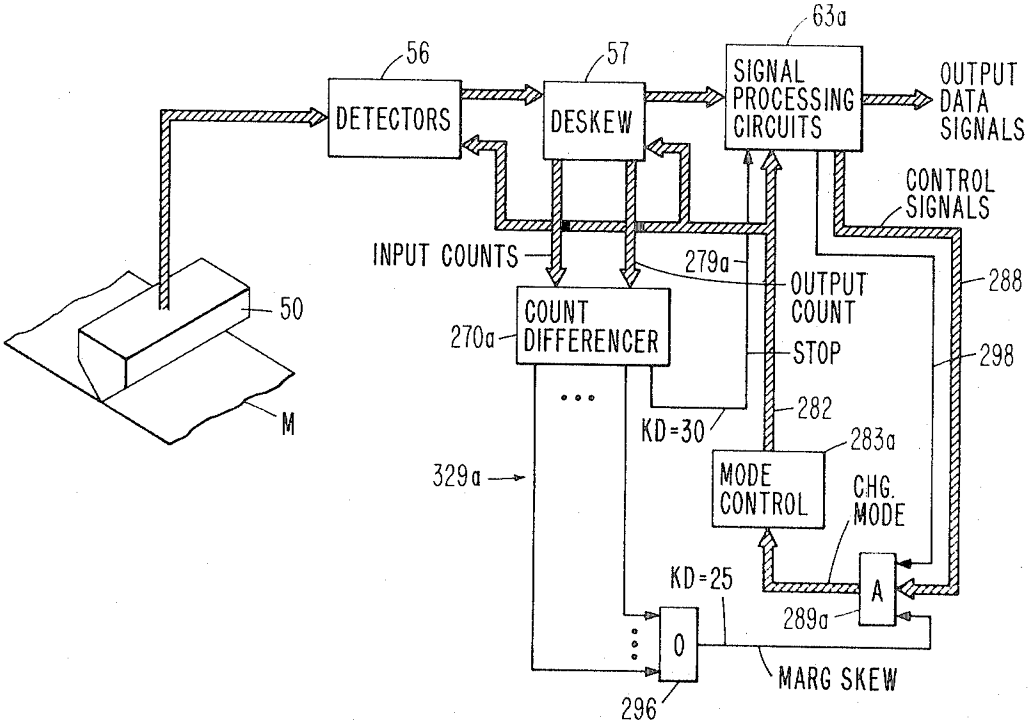
FIG. 1 is an abbreviated logic diagram of a readback system employing the invention with those circuit details illustrating the function of the invention within a readback system being accented.

Referring now to the drawing, like numerals indicate like parts and structural features in the various logic flow diagrams. In FIG. 1, multitrack transducer 50 senses signals recorded on multitrack media M, such as a ½-inch tape, and supplies the signals to a set of detectors 56, one detector for each track on media M. Detectors 56 respectively supply digital signals representative of the signals read back from media M, even with errors, to deskewing apparatus (SKB) 57. Deskewing apparatus 57 is constructed in accordance with the Floros patent, supra, and realigns the signals and supplies bytes or frames of realigned data signals to signal processing circuits 63*a*. These circuits include error detection and correction circuits which accommodate errors introduced into the data signals by the recorder for enabling the recorder to supply correct signals as output data signals to a utilization means (not shown), such as a data processing system. Details of some of the blocks just mentioned will become apparent from examination of the other figures.

Deskewing apparatus 57 supplies an input count to count differencer 270*a* for each of the tracks on media M signifying the last deskewing position which received a signal from such track, and hence the relative time position of signals from such track with respect to other tracks. Each input count is advanced by one for each bit period of the readback signal. Simultaneously, deskewing apparatus 57 also supplies an output count to count differencer 270*a* corresponding to the register address in deskewing apparatus 57 corresponding to the last register which has assembled or aligned one frame of data signals. The input counts are respectively driven by detectors 56 in accordance with the Floros patent. Count differencer 270*a* is constructed in accordance with the Morphet patent for detecting excessive skew. Whenever excessive skew is detected, an activating signal travels over line 279*a* to signal processing circuits 63*a*. These circuits respond to the excessive skew signal to abort the readback operation and supply an interruption signal to the controlling utilization means (not shown), the response of which is beyond the scope of the present description. For example, excessive skew may be indicated by a count difference (KD) of 30. In such a situation, deskewing apparatus 57 may employ 32 registers having addresses 0–31. Accordingly, when the most-leading readback signal is 30 registers or bit periods ahead of the readout count, excessive skew is indicated. Additionally, count differencer 270*a* has an additional set of count differencing circuits also constructed in accordance with the Morphet patent, supra, for indicating marginal skew (MARG SKEW) conditions. For example, when any input count has a difference of 25 from the output count of deskew apparatus 57, an activating signal is supplied over one of the lines 329*a* indicating that the given track has MARG SKEW.

If there are nine tracks, then there are nine lines 329*a* respectively associated with such tracks. OR circuit 296 combines all MARG SKEW signals into a single MARG SKEW signal traveling to AND circuits 289*a* for initiating a control function relating to signal processing circuits 63*a*, deskewing apparatus 57, and detectors 56.

In this embodiment, any signal indicating MARG SKEW is sufficient to activate the control functions with respect to all of the readback signals, hence, all of the tracks on media M. In this situation, MARG SKEW is used as a gating and mode control signal for the entire recorder, as will become apparent.

Figure 4:
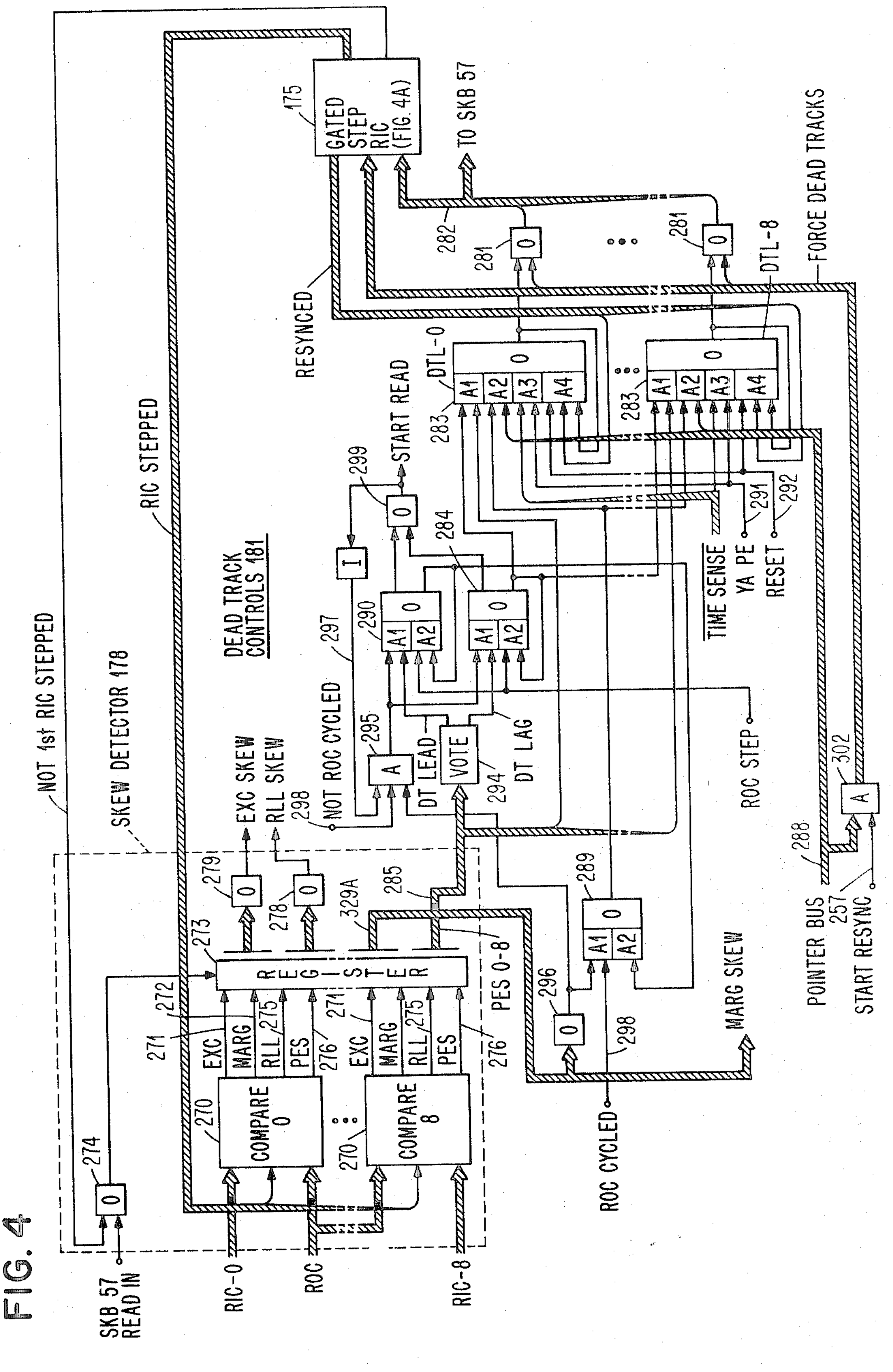
FIG. 4 is a simplified logic flow diagram of skew determining circuits, deadtrack control circuits, and deskewing control which are used in conjunction with the FIG. 5 illustrated apparatus for showing the incorporation of the invention in the FIG. 2 illustrated recorder.

The control functions performed in response to detection of a marginal skew condition are initiated by AND circuits 289*a*. Signal processing circuits 63a supply a set of control signals, one for each of the tracks, over cable 288 to respective ones of AND circuits 289*a*, collectively shown as a single symbol. These control signals, as used in the detailed embodiment of the present invention, are termed "persistent pointers" and point to tracks in error that have a continuing or burst of errors longer than is permitted by the design criteria of the recorder. Signal processing circuits 63*a* also supply a single data control signal over line 298 to complete the activation of AND's 289*a*. This control signal signifies that deskewing apparatus 57 has supplied realigned signals to signal processing circuits 63*a;* that is, the mode control effected by the MARG SKEW signal is not employed until after data signals have been received and detected by detector 56 to such an extent that deskewing apparatus 57 has realigned at least one set of data signals. While this is the preferred form of practicing the invention, no limitation thereto is intended. For example, as will become apparent with respect to the description of the FIG. 4 illustrated apparatus, the MARG SKEW control can be exercised before deskewing apparatus 57 has assembled a byte or frame of readback signals.

Whenever any one of the AND circuits 289*a* is activated as above described, the respective change mode signal is supplied to mode control 283*a*, one signal selectively supplied for each of the respective tracks. Mode control 283*a* has a plurality of control elements, later described, one for each of the tracks. When these mode control elements are set to the active condition, mode controlling signals are supplied over cable 282 to signal processing circuits 63*a*, deskewing apparatus 57, and detectors 56.

In a preferred form of the invention, mode control 283*a* consists of a deadtrack control as described in the Miller patent, supra. Mode control signals traveling over cable 282 are deadtrack initiating signals as described in the Miller patent. These deadtracking signals activate error correction circuits within signal processing circuits 63*a* as shown in the Hinz, Jr., patent, supra, as a pointer signal or selectively as shown in the Miller patent for error correction purposes.

Additionally, the mode control signals on cable 282 are supplied to deskewing apparatus 57. In the deadtracking mode, they inhibit the read-in count associated with the deadtracked track signal and also enable the readout counter, such as shown in the Floros patent, supra, to supply signals to signal processing circuits 63*a* without having received any signals from the deadtracked track. Additionally, detectors 56 associated with the given deadtrack may be inactivated. Alternatively, the detection circuits associated with the deadtracked track signal may be frequency synchronized to signals from other tracks for maintaining frequency approximation of the readback signal such that, upon resynchronization, the deadtracked detector may have a minimum frequency shift for resyncing to a readback signal. Such an operation is beyond the scope of the present description.

Accordingly, in FIG. 1, count differencer 270*a* not only provides excessive skew in accordance with the Morphet patent, supra, but also supplies MARG SKEW signals for activating the mode controls 283*a* on a selective basis in accordance with operational states in signal processing circuits 63*a*.

Figure 1A:
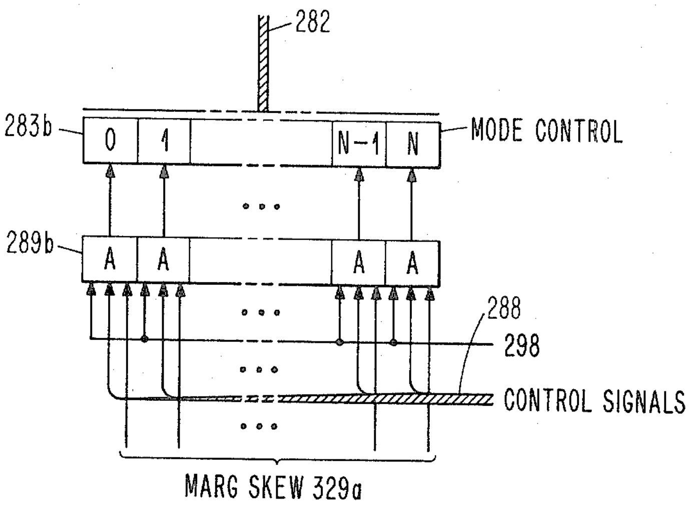
FIG. 1A is a simplified logic diagram usable with the FIG. 1 illustrated apparatus as a substitute in mode control functions.

Referring next to FIG. 1A, a modification of the invention is illustrated. In FIG. 1, OR circuit 296 enabled the change mode signal to be initiated for any of the tracks upon detection of any readback signal being in MARG SKEW with respect to deskewing apparatus 57 readout counter. In FIG. 1A, the mode control is changed such that only those tracks associated with a given MARG SKEW can have a mode change, such as from active readback to a deadtracking mode (operation in the erasure mode).

In this situation, mode control 283*b* has one mode controlling element for each track 0-N. AND circuits 289*a* have one AND circuit element associated with the respective mode control elements. Each of the AND circuit elements has three inputs for activating the respective mode control element which then, in turn, supplies the mode change activating signal over cable 282. MARG SKEW signals traveling over the respective lines 329*a* are fed directly to the AND elements 289*b*, respectively. Additionally, the corresponding control signals relating respectively to track 0-N on cable 288 jointly activate the AND elements whenever the data control signal is received from line 298, which is applied to all of the and elements. Accordingly, instead of MARG SKEW activating a mode change in any track having a given error condition, only those track signals both having an error condition are indicated by the control signals on cable 288 and exhibiting MARG SKEW will have the mode change from an active to a deadtracking mode.

ILLUSTRATIVE EMBODIMENT OF THE INVENTION

Figure 2:
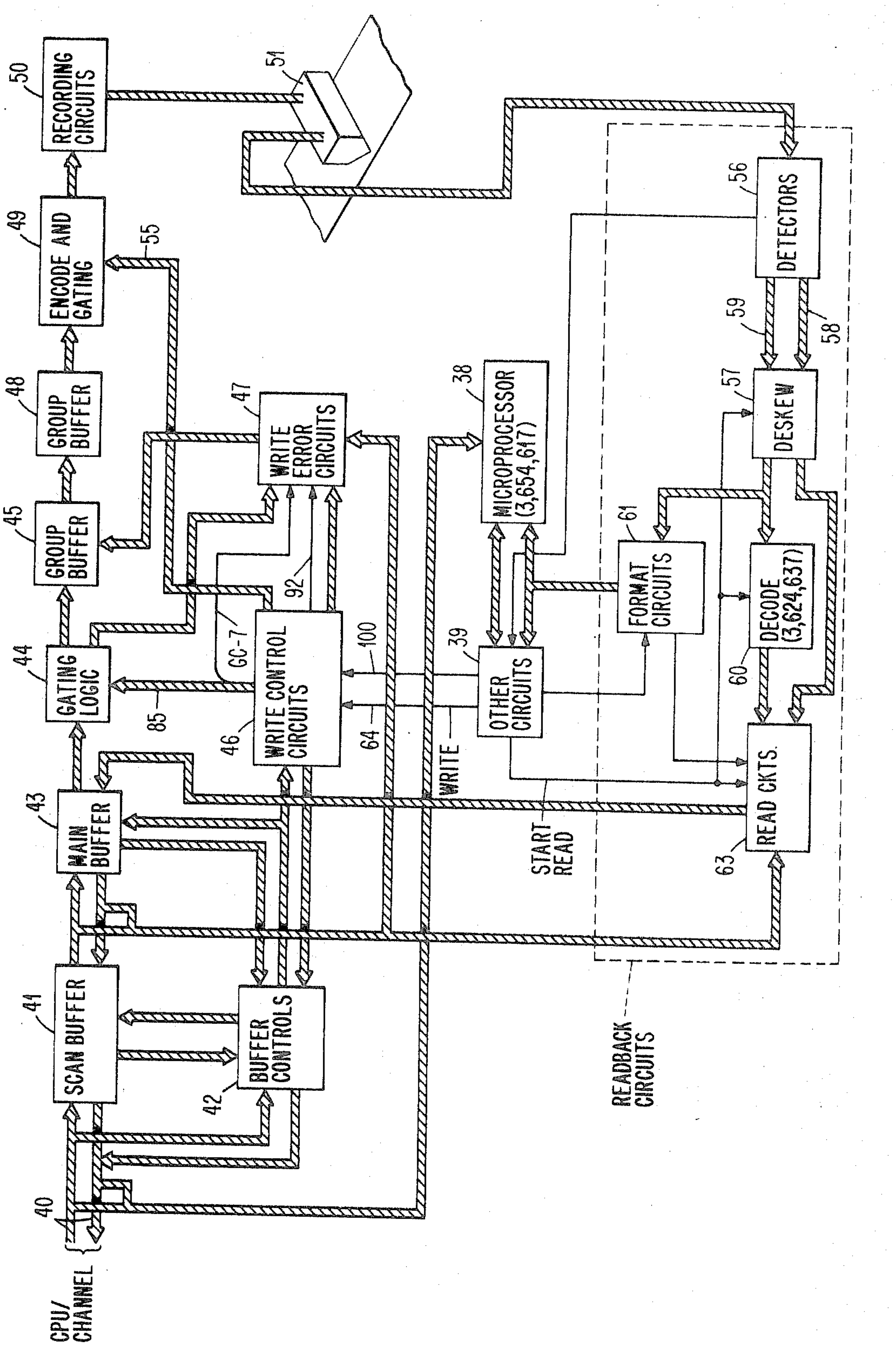
FIG. 2 is a simplified logic diagram of a digital magnetic recorder system which employs the invention as illustrated in FIG. 1.

Referring next to FIG. 2, an I/O system for a magnetic tape recorder employing the invention is shown in simplified diagrammatic form, some connections have been omitted for purposes of clarity. Such connections are either ascertainable from the description of related figures, from known techniques, or are a matter of design choice. Microprocessor 38 constructed in accordance with Irwin U.S. Pat. No. 3,654,617 controls the system in accordance with a microprogram of instructions. Additionally, other known circuits 39 are employed for sequencing controller operation in close coordination with microprocessor 38. Circuits 39 perform supervisory functions such as described in the Irwin U.S. Pat. No. 3,654,617. Data signals are exchanged with a data channel or CPU via cables 40, as well as control signals between circuits 39 or microprocessor 38 as more fully described in the Irwin U.S. Pat. No. 3,654,617, as well as in the Moyer U.S. Pat. No. 3,303,476 and as widely used by International Business Machines in their data processing systems. A scan-in/scan-out (scan) buffer 41 provides communication between cables 40 and main buffer 43 as sequenced by buffer controls 42. The operational arrangement here is not pertinent to the practice of the present invention.

Main buffer 43 preferably has a capacity of about 32 data bytes. It is basically a read-in/read-out count-controlled buffer. Main buffer 43 not only transfers signals to group buffer 45 for recording, but also receives data from read circuits 63 to be transferred over cables 40 to a connected CPU. Write control circuits 46 are supervised by microprocessor 38 and circuits 39 to generate a record format (not shown) on media M. Write error circuits 47 respond to signals received through gating logic 44 and the write control circuits 46 to generate error code bits as is well known. Group buffers 45 and 48 each receive groups of four bytes of data and check bit residues (Group A and Group B), each byte including an error detecting bit. These group buffers supply the four byte groups in parallel form to encoder-gating (EG) circuit 49. The encoding portions of circuit 49 are constructed in accordance with the Irwin U.S. Pat. No. 3,624,637 for converting the nine parallel groups of four bytes into nine five-bit storage code group values, each code value lying along one of several tracks on media M. EG 49 gates signals in a known manner for supplying serially arranged signals to recording circuits 50. Circuits 50 include the usual amplifiers and write compensation techniques, such as shown in Ambrico U.S. Pat. No. 3,503,059, and supply recording signals to transducer assembly or head 51 for recording such signals in tracks along media M.

For reproducing signals recorded on media M, detectors 56 receive signals from head 51. Detectors 56 include amplifiers and read compensation found in known digital data readback systems. Additionally, detectors 56 generate quality of readback signals as set forth in the Hinz, Jr., Patent, supra, and supply same over cable 58 to deskewing apparatus 57, synchronously with data signals supplied over cable 59. Deskew apparatus 57 is preferably constructed in accordance with U.S. Pat. No. 3,623,004 with accommodations being made for the record segment format of the present invention. For example, deskew apparatus 57 may include 32 registers for accommodating about three segments (one segment consists of Group A and B signals) of storage coded signals.

Figure 3:
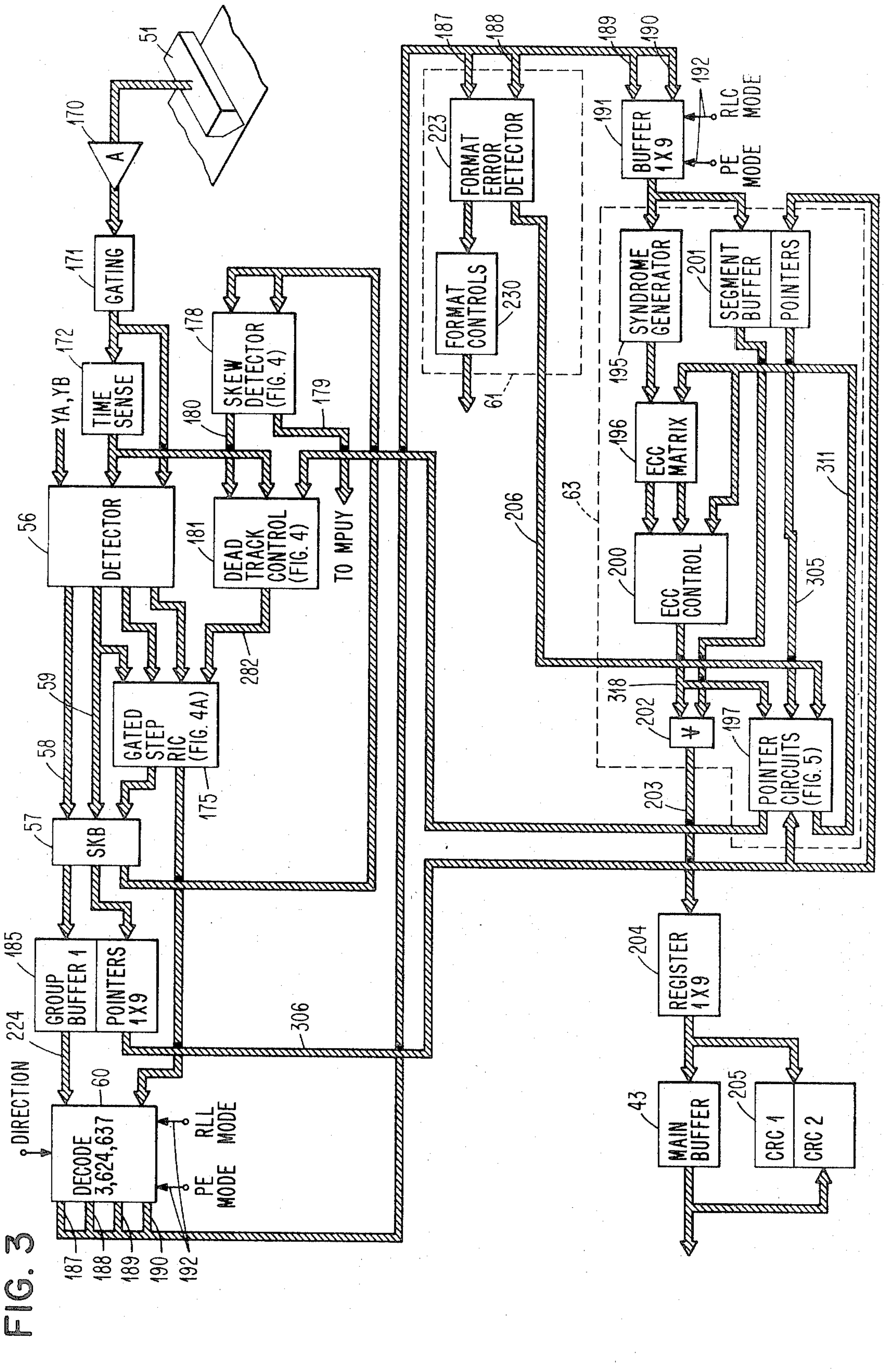
FIG. 3 is a simplified logic flow diagram of a readback system employable with the FIG. 2 illustrated digital recorder and having a greater detail for showing the functional interrelationships of various portions of a readback system with which the invention may be employed.

Deskew apparatus 57 supplies signals on a byte-by-byte (frame) basis to decode 60, constructed in accordance with U.S. Pat. No. 3,624,637. Readback quality indicating signals (later referred to) are supplied directly to read circuits 63 as shown in FIG. 3. Decode 60 supplies the decoded signals of four data bytes, or three data bytes plus a check bit byte, to read circuits 63 where they are combined with the quality signals for error detection and correction purposes. In the event of an improper five-bit code group being received, decode 60 also supplies a corresponding quality-indicating signal, referred to as a pointer. Additionally, format circuits 61 respond to the format signal groups, termed mark 1 and mark 2 (not shown) for starting and stopping data signal transfers and all-1's bytes in five successive bytes to indicate end of data in a record. Circuits 61 supply such detected signal permutations to other circuits 39 and to microprocessor 38 for their supervisory action.

Read circuits 63 pass correct data signals in repeated bursts of seven bytes to main buffer 43 for retransmission over cable 40 to a connected CPU (not shown).

The format marker signal groups, such as M1, M2, and the all-1's group (special code values — not shown) can be generated in write control circuits 46 (or microprocessor 38) and supplied to encoder and gating circuits 49 over cable 55. In the alternative, they may be supplied through gating logic 44 for encoding in five lengths of five-bit run-length limited code groups. It is preferred that microprocessor 38 generate such special signal groups using known computing techniques and supplying same to circuits 50. The techniques described in the Edstrom et al. article "Program Generated Recording," IBM TECHNICAL DISCLOSURE BULLETIN, November 1971, Pages 1821 and 1822, are preferred to be used in this regard.

For facilitating operation of error correction apparatus, the data record signals are grouped into two sets of four bytes or frames called data segments. Each data segment has one set of check bits associated therewith for error correction purposes. Additionally, each group of data signals is converted from four data frames or bytes to an encoded five record frames or bytes for recording. Upon readback, decoder 60 reconverts the five byte record signals back to four byte data signals. Each data segment has two data groups, Group A being the first group of four data bytes, while Group B is the second group having three data bytes puls a check bit byte. Additionally, one bit position in each of the data bytes/frames is reserved for a check bit.

READBACK CIRCUITS

Referring now more particularly to FIG. 3, the general logic arrangement of the readback system is described. From transducer assembly or head 51, low-level signals are amplified by linear amplifiers 170, one amplifier for each of the nine tracks on media M. The amplified signals received by gating circuits 171 are sensed for appropriate amplitude and then gated as hard-limited signals to time-sense circuits 172 and detector 56. The operation of circuits 171 and 172 is shown by Andresen et al. in U.S. Pat. No. 3,670,304. Detectors 56 each correspond to data detector 28 of that referenced patent application and is controlled in a similar manner. In addition, detectors 56 select between NRZI, PE, and run-length limited (RLL) coded detection in accordance with microprogram signals YA, YB, received from microprocessor 38 in accordance with FIG. 37 of Irwin U.S. Pat. No. 3,654,617. Detectors 56 each can be constructed in accordance with Vermeulen U.S. Pat. No. 3,548,327.

Detected 1's data is supplied over cable 58 to deskewing registers (SKB) 57. For each of the nine tracks, there is also a single line in cable 59 transferring pointer signals or quality signals to be deskewed in SKB 57 along with the data signals. Using the aforedescribed run-length limited coding, there will be five bit positions for each code group or value and a bit position for the quality signal associated with that code value as detected by a detector 56. Such quality signals are those described by Hinz, Jr., U.S. Pat. No. 3,639,900. SKB 57 deskews the data and pointer bits as shown in U.S. Pat. No. 3,623,004 for self-clocking systems (PE and RLL).

During the initial portion of reading a record from a magnetic tape, the preamble is first read and detected, but not forwarded through SKB 57. To detect that a preamble is coming to an end, gated step RIC circuit 175 is responsive to a string of ten 1's followed by a zero (PE — ten zeroes followed by a one) in each and every of the tracks to initiate SKB 57 operation. Detected M1 marker groups are inserted in the respective deskewing buffers for use by format circuits 61.

SKB 57 cooperates with skew detector 178 to detect excessive skew as defined and taught by Morphet U.S. Pat. No. 3,154,762 and as referenced in FIG. 4. The Morphet teaching applies to phase-encoded readback and to RLL readback. Upon detection of excessive skew, detector 178 supplies sense data over cable 179 to processor 38. Excessive skew signals are supplied over cable 180 to deadtrack control 181 for initiating deadtracking as shown in FIG. 4 and as taught by Miller U.S. Pat. No. 3,262,097. Deadtrack control 181 supplies deadtrack signals to circuits 175 to block transfer of data signals read from a deadtrack. Examination of FIG. 4 shows that skew detector 178 in accordance with the present invention supplies almost-excessive (marginal) skew indicating signals as an additional pointer for error correction, as will later be explained.

SKB 57 deskews the RLL and PE data in accordance with known deskewing techniques. When one byte of data bits has been assembled in each of the nine tracks, a readout cycle is initiated in SKB 57. A first set of buffers, group buffer 1, GB-1 185, receives one group (five bytes) of deskewed storage coded signals and associated quality signals, or hardware pointers, from SKB 57. Each time GB-1 185 is not full, it sends a request to SKB 57 for a transfer of one such byte. SKB 57 automatically responds to fill GB-1 185 in accordance with known data signal transferring techniques. It should be noted that the transfers between SKB 57 and GB-1 are independent of all other transfers in the readback system. It only requires that GB-1 be empty and SKB 57 has assembled and deskewed one group of storage coded signals.

The storage coded signals are then converted from the RLL storage code format to four-bit data processing coded groups, which may include check bits. GB-1, when full, supplies one group of signals from each of the nine tracks to decode 60. Decode 60 has one decoder for each of the nine tracks conveniently constructed in accordance with U.S. Pat. No. 3,624,637. Decode 60 has four groups of outputs. First are the detected format marker groups, such as M1, M2, and all-1's, which are supplied over cable 187 to format circuits 61. Second cable 188 transfers signals indicating that an illegal RLL code value has been decoded. This nine signal path cable connects to format detector 61 and eventually provides error signal pointers to later-described error correction circuits. The other two cables 189 and 190 carry decoded data from either the RLL or PE recordings through single-byte buffer 191. The cable is selected in accordance with the control signals received over lines 192 from microprocessor 38. In the RLL mode, the decoded bytes are serially transferred through cable 189 as four byte signal groups.

The decoded data transferred through buffer 191 is then processed by circuits 63. In the present application, buffer 191 supplies the decoded data on a byte-by-byte basis for each group to syndrome generator 195 which generates S1 and S2 error-indicating syndromes. ECC matrices 196 jointly respond to the S1 and S2 error-indicating syndromes, plus the data and pointers (including the almost-excessive skew pointers) from pointer circuits 197 (FIG. 5), to generate error-pointing patterns for ECC control 200. The decoded data from buffer 191 also is transferred through buffer 201 and is stored there during the error detection and correction operations of syndrome generator 195, ECC matrices 196, and ECC control 200. Exclusive OR circuits 202, one circuit for each track, are jointly responsive to the error patterns from ECC control 200 and the data synchronously supplied from buffer 201 to supply correct data signals over cable 203 to ECC output byte buffer 204. Sequence controls (not shown) request seven consecutive write cycles from main buffer 43. At this time, buffer 201 and ECC control serially and synchronously combine seven bytes of error patterns and data signals in Exclusive OR's 202 register 204 to supply seven corrected data bytes to main buffer 43. These signals are also applied to CRC circuits 205. The error detection and correction circuits may be those shown by Bossen U.S. patent, supra.

Returning now to pointer circuits 197, these circuits receive pointer signals from buffer 201 over cable 305 which resulted from detector 56 operation, from the RLL error detector in circuits 61 over cable 206 which indicate an illegal code value, from ECC control 200 indicating that a particular track has been corrected, and from skew detector 178. Based upon these inputs, pointer circuits 197 generate categories of pointers useful in error detection and correction as well as in deadtrack control. Generally speaking, pointer circuits 197 establish hierarchies of quality or pointer signals which, when positively indicating an error, are supplied as such to ECC matrix 196. If an error condition persists, a persistent pointer is generated and supplied to deadtrack control 181. According to the present invention, a marginal skew indicating signal gates the persistent pointer signals for effecting deadtracking operations — a mode change in the readback circuit operation.

In some instances, detectors 56 generate pointer errors supplied over cable 59 and thence transferred to buffer 201. This may indicate a possible error condition with detectors 56 correctly detecting the data. In such a case, pointer circuits 197 memorize that a pointer has been generated; but, such pointers are ignored by circuits 196, 200 until an error condition has been verified, as taught by Hinz, Jr., supra.

Readback operations may include four types of cycles while processing signals. Each cycle consists of eight steps enumerated 0–7. Each step is divided into first and second portions, a first portion for transferring data signals and a second portion which sets up control circuits for operations in subsequent cycles. Outside of the cycles there are wait periods during which no synchronous signal processing operations occur with respect to buffers, error correction, and the like, even though recording and other readback circuits may be active at this time. Of the four cycles, two cycles (the A cycle and B cycle) transfer, respectively, groups of signals between buffers 185 and 201, and A cycle transferring Group A of each segment and the B cycle transferring Group B of each segment — only four of the eight steps transfer data bytes. Format groups are always transferred during an A cycle. The third cycle, the AB cycle, controls the operation of the error correction circuits. If there are no errors in the data, AB cycle is omitted. If there is an uncorrectable error, the readback operation is stopped. The fourth cycle, ABC, transfers one segment of seven bytes of data signals from error correction circuits 63 to main buffer 43.

SKEW DETECTION

Having generally described transfer of data signals, the generation of some of the pointers in skew detector 178 and deadtrack initiation by deadtrack control 181 is described. These circuits operate in the synchronous portion of the readback system, that is, before synchronous transferring on a signal group basis from SKB 57. Accordingly, the four cycles of synchronous timing are not applicable to these circuits. Skew detector 178 is driven by SKB 57 RIC (read-in counter) and ROC (read-out counter) as described in the Morphet U.S. Pat. No. 3,154,762. Excessive skew is detected in accordance with that patent. In this regard, compare circuits 270, one of each track, compare the RIC and ROC counts of SKB 57 to detect excessive skew (EXC) for RLL readback, as indicated respectively on lines 271. This excessive skew is determined in accordance with the capability of SKB 57; for example, excessive skew may be defined as a skew of three groups of data signals—that is, the most leading track would be three groups of data signals ahead of the most-lagging track.

Similarly, lines 275 respectively carry excessive skew indication for readback of phase-encoded (PE) signals which is also used during recording RLL to detect excessive write skew. That is, during read-after-write recording verification, comparators 270 monitor skew and supply a skew check signal via OR 278 to microprocessor 38. similarly, excessive RLL readback skew travels through OR 279 to microprocessor 38 as an RLL read skew check signal. Also, lines 276 carry signals indicating excessive write skew for phase-encoded recording. The signals on line 276 also travel over cable 285 for dead-track determination, as will be described.

In envisioning the skew magnitudes, involved, excessive RLL read skew (lines 271) may be three groups or thirty record frames or bytes. The marginal RLL readback skew may be at least 25–27 record frames. Lines 275 are activated during RLL recording when the associated RIC leads ROC (most-lagging RIC or readback signal) by fourteen data frames. Similarly, lines 276 are activated during PE readback when the associated RIC leads ROC by four or more record frames. The latter number is selected to provide compatibility with the information interchange standards on phase-encoded recording. Based upon the above and following descriptions, it will be seen that the detected skew relationships are used to control errors during readback and recording in accordance with the record format of the media as well as the portion (synchronization or data) of the signal record currently being processed.

Additionally, there are two phases of skew detection. The first is during readback of a preamble or postamble and initial portion of data signal readback, and the second during data readback. The latter follows the Morphet patent teaching while also detailing marginal skew for greater reliability and throughput, while the former is an added feature to the described system. These two phases are used during readback of data signals and during read-after-write to veryify a proper recording operation.

In addition to detecting excessive skew, compare circuits 270 also detect and indicate marginal or almost-excessive skew. This indication is used both for resynchronization initiation and error correction, as will become apparent. In the illustrated embodiment, almostexcessive skew can be two groups of RLL encoded data between the most-leading track signal and the most-lagging track signal. When such almost-excessive skew exists between any RIC and ROC, an almost-excessive or marginal skew (MARG) signals travels over lines 272, respectively. These skew indicating signals are temporarily stored in register 273, one bit position being established respectively for each track's indication of excessive (one bit) and marginal (one bit) skew, respectively, to digit positions in register 273. During the first phase of operation, i.e., when the preamble or postamble portion of the record is being read, a continuous signal "not-first-RIC-stepped" from circuits 175 (later described) travels through OR 274 to maintain register 273 in a signal-receiving state. Register 273 may consist of a plurality of phase-hold latches, with the output signal from OR 274 enabling such phase-hold latches to receive signals. Removal of the signal causes the phase-hold latches to maintain the signal state until a new signal is being received, as is well known. In this manner, the output signals from compares 270 are continuously supplied through registers 273 for use by deadtrack controls 181, as will be described.

During the second phase of operation, i.e., during data readback, circuit 175 removes the not-first-RIC-stepped signal and turns control of register 273 to a control signal received from SKB 57. In thislregard, each time any data readback channel supplies a signal to SKB 57 andlthat signal has been stored in the deskewing registers, SKB 57 supplies an "end-read-in cycles" signal through OR 274 to momentarily actuate register 273 to receive the output signals from compare circuits 270. Such signals are then maintained until the next signal is read into SKB 57. Accordingly, register 173 signal state is updated each time SKB 57 receives a new signal from any of the readback channels. Generation of the "end-read-in cycle" signal is not described as it forms no essential part of the present invention, and generation of such signals is well known in the art.

DEADTRACK CONTROLS — 181

Deadtrack controls 181 receive the skew information from detector 178, as well as gated pointer signals from circuit 197, to determine deadtracking operations within SKB 57 in fundamental accordance with the Miller U.S. Pat. No. 3,262,097. Controls 181 initiate deadtracking under any one of four conditions as represented by the input signals to the A1, A2, and A3 input AND portions of deadtrack latches (DTL) 283 (one for each track), plus A-O circuit 289. Phase one control of deadtracking depends from the skew of the readback signals during start-up operations, while the remaining conditions are determined during data signal readback. Additionally, limited deadtracking is selectively initiated for resynchronization operations independent of error conditions during data signal readback.

During phase one, deadtrack control DTL's 283 are selectively set by the DT (deadtrack) lag latch 284 or the DT lead latch 290. Phase one extends from detection of beginning of block (BOB) until beginning of data signal readback. During this phase, register 273 is continuously sending the marginal and excessive skew signals to deadtrack controls 181. OR 296 takes any one of the marginal skew signals to activate AND 295 for selectively setting either DT lead latch 290 or DT lag latch 284 in accordance with the analysis of skew by voting circuit 294. These latches then respectively gate deadtrack indicating signals to DTL's 283 in accordance with the then skew conditions indicated by comparators 270.

To set DTL's 283 for initiating deadtracking at the onset of data readback, a lagging condition of a few of the tracks as indicated by deadtrack lagging tracks latch 284 is set by the input A1 portion. This A1 portion combines the skew indication signals received over cable 285 from register 273 with the 6/8 track lead signal to activate latch 284. In this instance, DTL's 283 are respectively set by the skew indicators with a lagging condition (those RIC's having tallies closest to the then tally in ROC). The term 6/8 lead means that at least 6 of 8 tracks (excluding parity) are leading.

On the other hand, when voting circuit 294 indicates that 6 of the 8 tracks (excluding parity) are lagging, that is, there are eight one or two extremely leading tracks, then the A1 portion of latch 290 responds to that signal, plus the output signal of AND 295, AND 295 signifies that the skew buffer readout counter has not cycled (still reading the preamble), and reading has not started. The active signal of latch 290 goes to A-O 289, as later described, to selectively set the deadtrack latches 283 corresponding to the most-leading tracks.

In the preferred form, latches 290 and 284 are sensed when the most-leading track has reached the 26th frame or byte from the data. That is, from the marker signal M1, the most-leading track has already read in 26 bits of data. A marginal skew signal from any track passing through OR 296 when ROC has not cycled signifies that at least one track has been read to the 26th frame and yet at least one other track has not been read to the end-of preamble marker signal.

During phase one, whenever readout counter of SKB 57 has stepped, i.e., a full group of data bytes, such as a Group A, has been assembled, reset signal is supplied to the A2 portions of latches 284 and 290 resetting same. The inversion of this signal is supplied as an input to AND 295 which gates the setting input to the two latches. Therefore, anytime the readout counter has cycled, i.e., a full group of data signals has been assembled, phase one skew checking terminates and no test is made. Such a condition shows successful readout from all tracks.

For phase one deadtrack initiation, the line 276 skew indicators are combined with the active output signals of latches 284 and 290. During the lead condition, the output signal of A-O 289, which is activated by the output signal of latch 290, is supplied to the A2 portion of all of the DTL's 283. This signal is combined with the gated pointer signals from circuits 197 to set the DTL's. A leading track in error can only be detected by combining the deadtrack leading track latch signal 290 with pointer signals from circuits 197. These pointer signals indicate almost excessive skew condition in the respective tracks. Accordingly, the pointer signals are not only used for error correction purposes, but also initially determining whether or not one of a given plurality of tracks that are leading or lagging in a deskewing relationship for determining whether or not that track may be in error and should be deadtracked.

During the data readback phase, DTL's 283 are selectively set either by the A2 or A3 input portions; the A2 portions, therefore, being used both during phase one and phase two. The A1 input portion of A-O 289, during the data readback portion, selectively receives the ROC cycled signal over line 298 from SKB 57. That is, after the first group of signals is read from SKB 57, skew conditions are repeatedly tested. The output signal of OR 296 indicating marginal skew is gated by the ROC cycled signal through A-O 289 to partially activate all of the A2 input portions of DTL's 283. This signal is combined therein with the pointer signals received over cable 288 from pointer circuits 197. The A1 and A2 portions are used both during the RLL mode and the PE mode, during the initiation or the onset of data readback of any record on a magnetic media.

A3 portions of DTL's 283 initiate deadtracking during data readback in the PE mode of operation. These circuit portions are jointly responsive to signals from time sensor 172 indicating loss of signal envelope and the PE mode as indicated by processor 38 over line 291 to supply deadtrack initiating signals over cable 282 to SKB 57. Alternately, pointer signals on cable 288 may activate deadtracking in the PE mode.

Input portion A4 is the reset and hold portion. Each DTL 283 output maintains the latch in its activated state as is well known. Reset signals received over line 292 reset all DTL's 283 upon a resynchronization as effected by the intrarecord resynchronization patent by Irwin, supra, or upon the initiation of reading a record as indicated by processor 38.

Because of resynchronization capabilities of the readback system and the inhibition of deadtrack until excessive skew and a pointer signal on cable 288 indicating an extended error condition during readout, deadtracking is selectively initiated upon the onset of encountering a resynchronization pattern by the reading transducers. In this regard, AND circuits 302 respond to the start resync signal (see Irwin U.S. Pat. No. 3,641,534 on line 257 to pass persistent pointer signals traveling over cable 288 to OR circuits 281 for initiating limited deadtracking during the resynchronization portion for facilitating resynchronization of the respective readback circuits in accordance with the Irwin patent on intra-record resynchronization, supra. During limited deadtracking, readback signals are processed through SKB 57; the controls shown in FIG. 4 are merely activated to enable resynchronization of such readback channel. This action ensures that a readback circuit almost reaching a deadtracking situation can be automatically readjusted to proper read-in into SKB 57 in accordance with the actual skew and adjusts its readback VFC (variable frequency clock) by the resynchronization burst as described in said patent. In this manner, deadtracking is delayed until the last possible moment when a marginally operating readback circuit starts to process resynchronization data. The deadtrack initiation makes the VFC of that track responsive to the resynchronization signal thereby enhancing the probability of the circuit automatically adjusting to the proper mode of operation during the resynchronization sets.

SKB CONTROL

Figure 4A:
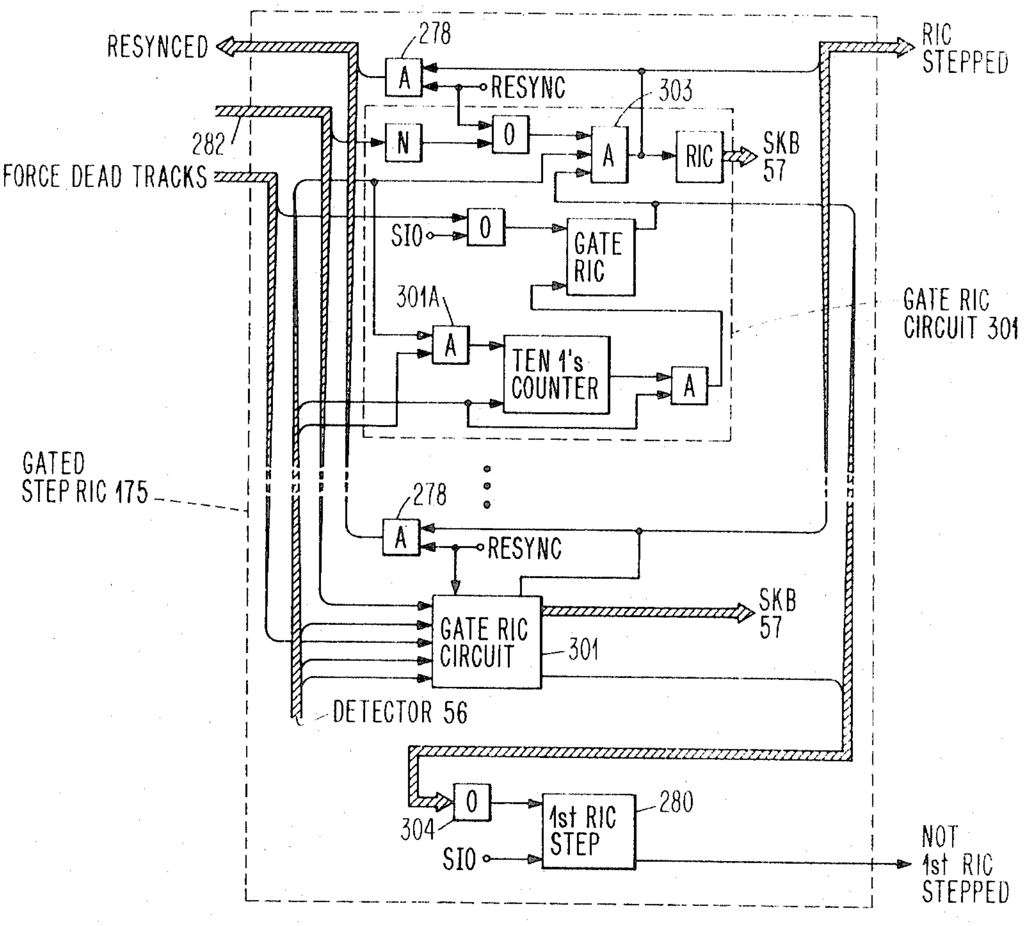
FIG. 4A shows a gated step RIC circuit used in the FIG. 4 illustrated apparatus.

SKB 57 operation is initiated in the gated step RIC circuit 175 (FIG. 4A). Output signals from detector 56 supplied to gate-RIC circuits 301 over the 1's line are timed by the detector 56 generated clock signals (not shown) over the clock line to increment the ten-1's counter in each of the respective circuits 301. There is one such circuit for each of the respective readback circuits associated with the various tracks on the media. Each preamble and postamble, as well as resync patterns as previously described, include ten 1's in a row. The ten-1's counter in the respective circuits detects that a mark-1 (read backward) or mark-2 (read forward) signal is about to be detected. If, during a clock time, a 0 is supplied, the ten-1's counter is reset ensuring that only ten successive 1's cause it to overflow to set the ten-1's latch in the respective circuits. Each of the circuits 301 operate in accordance with the readback signal frequency in the respective track. Accordingly, the ten-1's latch in the respective circuits 301 may be set at differing times. Upon being set, each of the respective ten-1's latches supply an activating signal to its respective AND circuit 303 for stepping the RIC (read-in counter) of SKB 57 (for convenience shown as being a part of each of the circuits 301). The ten-1's latch also supplies the activating signal through OR circuit 304 to set first-RIC-step latch 280; that is, the first ten-1's latch in any of the circuits 301 becoming active sets the first-RIC-step latch 280. This latch being set supplies an activating signal through OR circuit 274 to enable register 273 to start receiving the output of comparators 270, as previously described.

AND 303 passes clock pulses derived from the readback signal in a known manner by detector 56 to step each respective RIC for transferring signals into SKB 57 as has previously been referred to. Additionally, the output signals of OR's 281 are inverted and supplied to AND 303 for indicating that the respective track is not being deadtracked. Accordingly, when the respective OR's 281 are supplying a deadtrack indicating signal, the respective AND 303 is disabled preventing the respective RIC from stepping signals into SKB 57. Accordingly, the deadtrack signals are also supplied from cable 282 to SKB 57 to set the readout counter (ROC) to step independent of a given RIC being inactivated. Such deadtracking signal also enables readout from SKB 57 without the signals from a "deadtrack" as shown in Miller, supra.

Circuits 175 are reset each time a start I/O (SIO) signal is presented to the I/O controller by the CPU (not shown). Resetting the circuit merely requires that the first-RIC-step latch 280 and all of the ten-1's latches be reset. The ten-1's counters will be reset by any of the 0's being supplied by detector 56. In this regard, AND 301A is responsive to the not-1 signal and the clock signal to reset the ten-1's counter.

Upon a resynchronization burst being encountered, it will be recalled that a deadtrack may be forced by one of the AND's 302. In this regard, the respective OR 281 passes the deadtrack signal to disable AND 303 upon entering the resync burst. The ten-1's counter is responsive to ten 1's in a row in the middle of the resync burst to again set the ten-1's latch, which has previously been reset by the force deadtrack. Upon receipt from detector 56 in accordance with the Irwin U.S. Pat. No. 3,641,534, AND 303 becomes enabled again to pass clock signals for again stepping the respective RIC for passing the mark-2 signals occurring at the end of the resynchronization pattern into SKB 57. Upon resync being established, the deadtrack latches 283 are reset by AND's 278 and as shown in the Irwin patent, supra.

During the PE mode, the 40 0's in the preamble or postamble are inverted to 1's to activate the ten-2's counter. Upon detection of the PE marker signal and the ten-1's count, the respective RIC's initiate counting. The apparatus for accomplishing this action has been omitted for brevity.

POINTER SIGNAL HANDLING

Pointers, that is, signals pointing to possible or actual error conditions, include quality-indicating signals. Such signals are generated preferably in accordance with the Hinz, Jr., U.S. Pat. No. 3,639,900. The present illustrated embodiment provides additional pointer signal handling functions which enhance error correction capabilities of the readback signal over and above that taught by Hinz, Jr. While the fundamental principles of the Hinz, Jr., patent have been retained for use with the present invention, the hierarchy of pointer signal handling and gating plus evaluation enhances error correction and control, as will become apparent. According to one aspect of the present invention, the MARG SKEW gating function is combined with the Hinz, Jr., pointers for enhancing digital recorder throughput.

The so-called hardware pointers are readback quality signals referred to by Hinz, Jr. These hardware pointers are generated in detector 56 and then supplied over cable 59 to SKB 57. SKB 57 deskews such quality or hardware pointer signals with the data signals received over cable 58. Whenever SKB 57 supplies a group of data signals to group buffer 185, the corresponding pointer signals are also simultaneously supplied to a portion of the group buffer called pointers, one pointer bit position for each track corresponding to one group of data signals. These buffered pointer signals are supplied over cable 306 to the pointer portion of segment buffer 201 in circuits 63, thence to pointer circuits over cable 305 as "hardware pointers." This transfer bypasses the decode operation for the data signals in buffer 185. This action buffers the pointers with the two groups of data signals; that is, possible error conditions in both groups of signals are forwarded along with the corresponding group of data signals in accordance with the Hinz, Jr., teaching. Additionally, the cable 306 signals, in accordance with the Hinz, Jr., teaching that an error condition may be indicated by a low-quality signal after the error actually occurs, are termed "group hardware pointers." These are "look-ahead" pointers.

Figure 5:
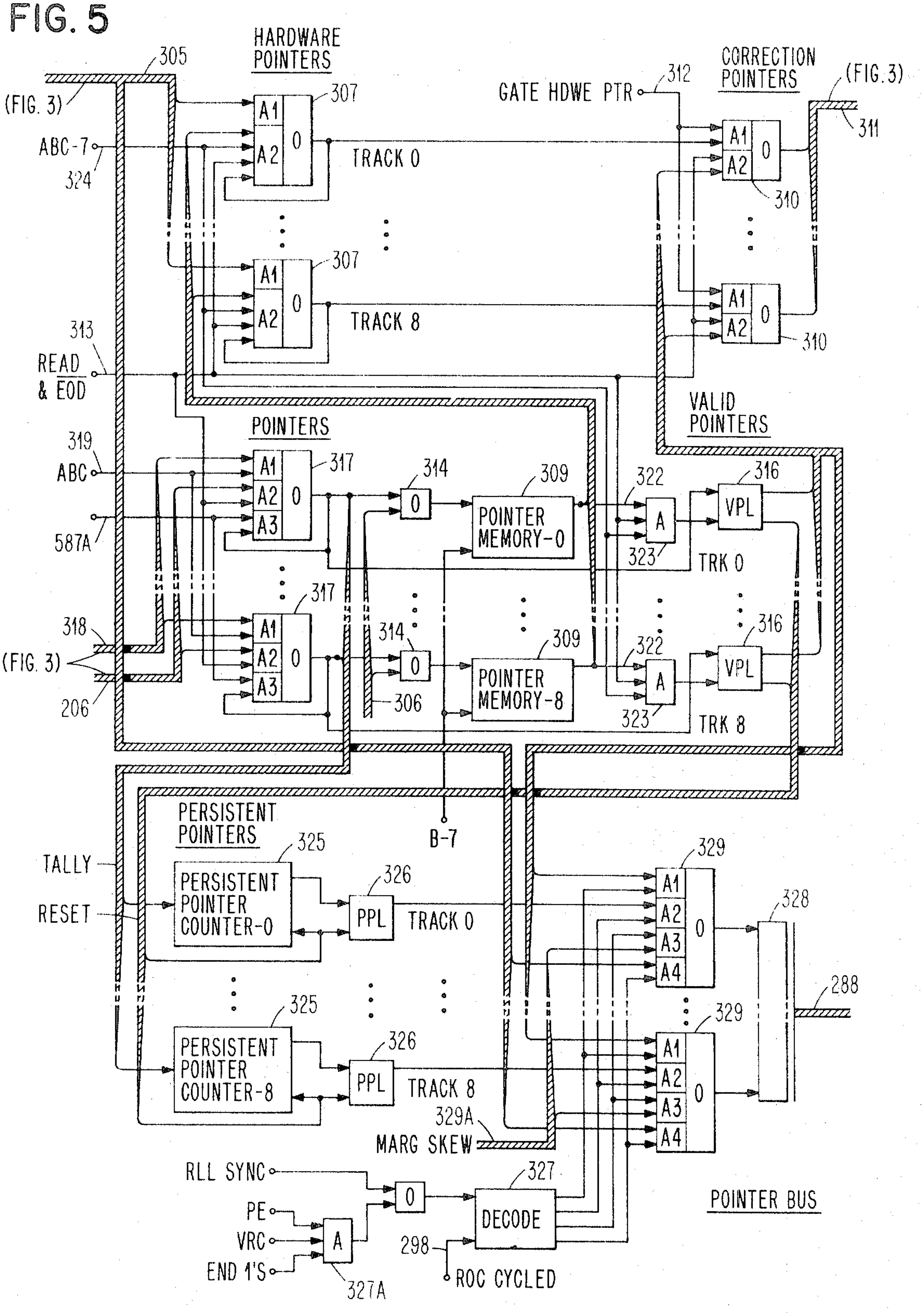
FIG. 5 is a simplified logic diagram of pointer memory and pointer control circuits which supply pointer signals to the FIG. 4 illustrated apparatus for being combined with the marginal skew signals for effecting error control functions in the FIG. 8 illustrated apparatus.

Referring now to FIG. 5, the "corresponding" hardware pointers in buffer 201 go over cable 305 to hardware pointer A-O's 307, one A-O for each track 0-8. As shown, A-O's 307 are connected as a latch which holds the hardware pointers during the processing of one data segment. These latches are reset by timing signal ABC-7, when the corresponding pointer memory counters 309 have countered to zero (or any other reference count) as later described, to indicate prior conditions.

Upon being actuated, A-O latches 307 supply activating signals to correction pointer generator A-O circuits 310, one A-O per track. These circuits supply correction pointers to error correction circuits 63 (see the Bossen patent, supra) over cable 311, one signal path in cable 311 for each of the tracks. The A1 portions of A-O's 310 pass the hardware pointer signals upon receipt of an activating signal over line 312 from error correction circuits 63. The signal on line 312 represents an error condition has been detected by the error correction circuits which require the utilization of pointers. In Bossen, supra, this condition is detection of more than one track in error.

Valid pointers (later described) are also gated to correction pointer bus 311 by the respective A2 portions of A-O's 310. A2 portions are activated during a read mode, and end of data (EOD) has not been received as indicated by the signal received over line 313 from microprocessor 38. Note that the valid pointers, i.e., pointers that indicate an error correction has been made corresponding to the pointer condition, are gated as correction pointers irrespective of the request for pointer signals from the error correction circuits.

Hinz, Jr., also teaches that error or low-signal quality conditions also precede the actual data error. To take advantage of this teaching, pointer memory counters 309 remember pointers for seven error-free record segments. This action generates "look-behind" the error pointers. Accordingly, in addition to the pointers from buffer 185 being supplied to the pointer portion of segment buffer 201, they are also supplied directly to pointer circuits 197 for controlling the pointer memory counters. In this regard, OR circuits 314 pass hardware pointer signals from cable 306 and valid pointer signals from A-O's 317 for resetting the pointer counters to an error-indicating condition. Such resetting action prevents A-O latches 307 from being reset thereby maintaining hardware pointers on a "look-behind" basis. Hence, A-O's 307 can receive the hardware pointers from segment buffer 201 corresponding to the data signals being processed in the error correction circuits 63 or the "look-ahead" pointers on cable 306. To the extent that two groups of signals are processed simultaneously (one segment), the pointer signals in buffer 201 are both "look-ahead" and "look-behind" pointers with respect to data signals in Groups A and B, respectively.

Valid pointers are stored in FIG. 5 illustrated circuits in the respective valid pointer latches (VPL) 316. Any of the latches being set respectively indicate that a pointer signal has corresponded to an actual error correction activity of circuit 63. In other words, the pointers have validly pointed to an actual error condition in which an error correction was made or a code error was detected by format circuits 61. VPL's are set to the active condition by the action of A-O latches 317. The A1 portions of the respective A-O's 317 are activated when an error correction has been made by circuit 63 in the corresponding data bit position. ECC track correction signals received over cable 318, respectively, jointly activate the A1 portions when the corresponding data bit is transferred by ECC circuit 63 to data read buffer 204. As timed by the line 319 signal, that action is not pertinent to an understanding of the invention.

The A2 portions of A-O's 317 are jointly responsive to the RLL error signal received over cable 206 and to the RLL mode and not end of data (EOD) signal received over 313, as previously mentioned with respect to A-O's 310. From the above description, it is seen that the VPL's 316 are set to the active condition in response to any of the hardware or valid pointers supplied as correction pointers over cable 311, resulting in an actual error correction; or upon a "hard error" being indicated by an RLL invalid code character.

The A3 portions of A-O latches 317 are the latch forming or holding input. While processing each data segment, each A-O latch 317 can be set once to supply a tally signal to persistent pointer counters 325. After the ABC or output data transfer cycle, and before the next occurring input data transfer or A cycle, a buffer 185 full signal (signifying buffer 185 has received data signals from SKB 57) resets all A-O latches 317. All those latches are then ready to receive new pointer signals.

Once a VPL 316 is activated, it will remain active until at least seven data segments have been processed. In this regard, pointer memory counters 309 being reset by a hardware pointer received over cable 306 or the VPL 316 setting signals (A-O 317) passing through OR's 314 maintain a memory of the pointer for a period of seven data segments even though the hardware or RLL pointer condition may have been erased. VPL's 316 are reset whenever pointer memory counters 309 reach a reference state (such as zero) indicating that seven data segments have been processed through the readback circuits without an error condition or a hardware pointer being received. Pointer memory counters 309 respectively supply error-free indicating signals over lines 322 to reset VPL's 316. AND circuits 323 are respectively responsive to signals on the lines 322 and the RLL mode and not end of data signal on line 313 to reset VPL's 316. Resetting is synchronized by a so-called ABC-7 timing pulse received over line 324 from a timing control (not shown).

From the above description, it can be seen that pointer signals can be generated based upon error correction activities with any of the tracks as soon as the error condition is removed. Other track circuits may subsequently generate hardware pointers, valid pointers, and the like. All of this action occurs without deadtracking any of the tracks, provided excessive skew is not encountered. In this regard, if there is a temporary loss of signal amplitude or an excessive phase shift causing a loss of one or more data bits from a given track, there will be an apparent increase in leading or lagging skew of the track; that is, the corresponding RIC will not be stepped in a synchronous manner with the data frequency on the corresponding track because of such loss. When this occurs, an almost-skew condition (MARG SKEW) will point to the loss of the data bits which is interpreted by the FIG. 4 illustrated deadtrack control circuits for causing deadtracking under certain conditions. By deferring the deadtrack initiation, an increased number of errors can be corrected in that, once the error condition not causing an overly extended burst of errors disappears, the powerful error correction code described by Bossen, supra, can recover from such errors. Because of such powerful codes, the deadtracking can be safely deferred as opposed to other recording schemes wherein only one track in error can be successfully corrected.

The overly extended burst error condition is indicated by persistent pointers. By arbitrary definition, an extended error condition is defined when the valid pointer exists more than twelve continuous data segments in any given track; that is, VPL's 316 remain set while twelve data segments are being corrected. In this regard, persistent pointer counters 325 step once for each signal received from the respective A-O's 317. That is, each time the ECC circuits 63 correct an error in a given data segment, an activating signal is supplied to set the respective VPL's 316. The same signal steps the respective persistent pointer counters. When an A-O latch 317 is set, the transition increments the corresponding counter 325. After time ABC-7, A-O latches 317 are reset by circuits 39 in preparation for the next timing sequence A-O through ABC-7. Upon reaching twelve, persistent pointer counters 325 supply an activating signal setting persistent pointer latches (PPL) 326 which indicate extended or repeated error conditions in the respective tracks.

Persistent pointer counters 325 may approach the threshold of twelve continuous data segments in error and still not set the persistent pointer latches 326. In this regard, VPL's 316, when reset, supply an activating signal over lines 327, respectively, which resets persistent pointer counters 325 to the reference or zero condition, as well as resetting persistent pointer latches 326.

The above-described valid pointers and persistent pointers, together with MARG SKEW signals or pointers, are selectively gated through A-O's 329, thence, driving register 328 to pointer bus 288. The selective gating is based upon the format being read back from the record media and what portion of the recorded signal format is currently being processed. While reading back RLL encoded data signals, at one time or another during the readback of each record block, all three types of pointer signals appear on pointer bus 288. Decoder 327 supplies four phase signals sequentially gating input portions A1 through A3 (not in that order) of A-O's 329. The A4 portion is used for diagnostic procedures beyond the scope of the present disclosure. When reading back RLL encoded data signals during the preamble portion, A3 input portions are selectively activated by decoder 327 to pass the marginal skew indicating signals from cable 329A to pointer bus 288. It may be recalled that the FIG. 4 illustrated apparatus takes the gated pointer signals from pointer bus 288 and selectively uses such signals for deadtracking readback signal channels under MARG SKEW control. Such gated MARG SKEW signals are then applied to the respective A2 input portions of DTL's 283 of FIG. 4. Accordingly, during the preamble or initializing portions of readback, the marginal skew signals select which readback channels are to be deadtracked.

Once data has been detected and one group of readback signals have been deskewed (ROC cycled), then valid pointer signals from VPL's 316 are gated through A1 portions of A-O's 329 to pointer bus 288. These valid pointers are then used by the A2 input portions of DTL's 283 for selecting which readback channel is to be deadtracked. Upon encountering a resynchronization pattern, persistent pointers from PPL's 326 are selectively gated through the A2 input portions of A-O's 329 for being applied to the A2 input portions of DTL's 283. In the preferred form, either microprocessor 38 or other circuits 39 predicts when a resynchronization pattern is expected for causing the persistent pointers to be gated. In accordance with Irwin U.S. Pat. No. 3,641,534, the number of ROC rotations (number of recorder data frames or bytes) interposed between successive resynchronization patterns is preferably fixed, for example, 50 ROC rotations or 1,600 data frames (160 data segments). When 49 ROC rotations have occurred since the last encountered resync pattern or preamble, the sync input to decoder 327 is activated in accordance with Irwin U.S. Pat. No. 3,654,617. This action replaces the valid pointers on pointer bus 288 with persistent pointers. Hence, resynchronization of readback channels is initiated by error pointers. By gating the persistent pointer one ROC rotation before resync, even the most-leading signal track will not be resynchronized unless a persistent pointer is present.

When the above-described circuits are used in connection with readback of PE signals, the preamble operations are the same; however, the valid pointers from VPL's 316 are gated to pointer bus 288 during reading the postamble; while the persistent pointers from PPL's 326 are gated to pointer bus 288 during the data readback portion. Gating persistent pointers to pointer bus 288 delays the deadtracking operation initiatable by the respective A2 portions of DTL's 283 until a persistent error condition has been detected in the PE readback signals. For simplicity, the conditions causing the scan type pointer gating are set forth in the table below:

| ROC Cycled | SYNC with Tape OP | pointer Bus | RLL | PE |
|---|---|---|---|---|
| 0 | 0 | HDWE | Diagnostics | Diagnostics |
| 0 | 1 | MARG | Preamble | Preamble |
| 1 | 0 | VALID | DATA | Postamble |
| 1 | 1 | PERS | RESYNC | DATA |

The "ROC-cycled" signal, received from SKB 57 over line 298, indicates that data has been read out at least once from SKB 57 in a given record block of signals. This signal remains active from the marker position M1 or the first all-1's marker of PE until the end-of-record has been detected. During the RLL mode, the RLL-SYNC signal provides the other input to decoder 327. This signal is preferably generated by microprocessor 38. Initially, processor 38 supplies the sync signal until ROC cycles once; it is then deactivated. Additionally, as described above, this signal is activated during the resynchronization patterns. Accordingly, in the RLL mode, persistent pointers are gated through during resynchronization periods.

During the PE readback mode, AND circuit 327A supplies an active signal to decoder 327 corresponding to the RLL-SYNC signal whenever there is a VRC (vertical redundancy check), i.e., an error condition detected by the parity error detection scheme of PE recording and the end-1's, i.e., the last marker signal of PE recording has been detected indicating the postamble is being entered. From examination of the above table and FIG. 5, the timing relationships with respect to the RLL and PE record formats for gating pointer signals to pointer bus 288 can be readily deduced.

The above-described selective gating of pointer signals from other error indicating signals enables the readback circuitry to make greater advantage of the error indications than have been detected during readback. Because the reliability of the readback will increase after the preamble has been read and all of the readback channels have synchronized on the readback signal, various degrees of pointer reliability are desired for controlling deadtracking and error correction. It is also noted that during the PE readback the deadtracking initiation is delayed by the counting modulus of persistent pointer counters 325. In that application, the persistent pointer counters 325 can have their modulus changed, for example, from 12 to 8, for initiating deadtracking sooner. Of course, in the alternative, eight data segments or eight PE frames may be selected as the persistent pointer criteria. The number selected is a design consideration in the particular data signal readback system.

In summary, the marginal skew indicating signals for each track travel over cable 329A. Then, OR 296 combines these signals into a single marginal skew signal for all tracks. A-O 289 responds to the ROC cycled (data has been assembled by deskew apparatus 57) to partially activate all A2 input portions of DTL's 283. The persistent error pointers received over pointer bus 288 selectively activate those A2 portions associated with record tracks having persisting errors for deadtrack initiation. Deadtracking is a mode change which eliminates readback signals from a given record track for enhancing error correction. The deadtrack indicating signals from the respective DTL's 283 drive error correction apparatus as quality or error pointer signals in accordance with the Hinz, Jr., and Miller patents, supra.

While the invention has been described in detail with respect to dynamic skew (tape slewing, etc.) measurement, it is equally applicable to using static skew (head-to-tape misalignment and intergap scatter, for example). Such static skew for a given readback operation may be measured by sensing elapsed time first between a first detected signal from a record track (most-leading) and the corresponding first received signal from a most-lagging track. Such measure skew usually falls below excessive skew. Upon measuring such skew, control functions are initiated in the readback system for affecting readback operations. Such an operation may include an automatic determination of when to sense for data signals, i.e., open a data gate to transfer readback signals to SKB 57.

While the invention has been particularly shown and described with reference to preferred embodiment thereof, it will be understood by those skilled in the art that various changes in form and detail may be made therein without departing from the spirit and scope of the invention.

What is claimed is:

1. For a magnetic readback system adapted to reproduce signals (readback signals) from a plurality of record tracks of a multitrack magnetic record media;

deskewing means for realigning readback signals from a set of record tracks into bytes;

counting operatively connected to said deskewing means and means indicating leading, lagging, and count skew by count differences between digit positions containing most-leading signals from said respective tracks;

first threshold means responsive to a given count difference to indicate excessive skew;

second threshold means responsive to a second given count difference to indicate almost-excessive skew;

control means responsive to said first means excessive skew indication to abort readback and having error control means to perform a second function in response to said second means almost-excessive skew indications; and signal processing means for receiving and processing signals from said deskewing means and selectively responsive to said second means almost-excessive skew indications to perform an error control function on said readback signals.

2. The subject matter set forth in claim 1 for providing an error control function, the improvement further including:

error detection and correction means in said signal processing means for detecting and correcting errors;

pointer memory means responsive to said error detection and correction means to memorize that error corrections were made in signals received from a given track;

said control means further including comparison means jointly responsive to said memorized error corrections and to said second means almost-excessive skew indications to initiate said control means to perform said second function; and deadtrack means in said signal processing means selectively responsive to said second function to deadtrack said given track.

3. The subject matter set forth in claim 2 wherein:

said second threshold means supplies one of said second means almost-excessive skew indications for each of said tracks;

gating means in said control means electrically interposed between said second means and said comparison means for selectively passing said second means almost-excessive skew indications; and said signal processing means indicating that data signals are being processed for actuating said gating means to pass said second means indications.

4. The subject matter set forth in claim 3 further including combining means combining said second means almost-excessive skew indications for each of said tracks into a single indication to actuate said deadtrack means for all of said tracks to respond to said pointer memory means for deadtracking all tracks yielding said memorized error corrections irrespective of whether signals from such tracks are in fact exceeding said second threshold or not.

5. The subject matter of claim 1 further including:

said signal processing means supplying control signals associated with readback signals from said respective record tracks, respectively;

gating means receiving all said control signals and responsive to said second means almost-excessive skew indications to selectively pass said control signals; and mode control means in said control means responsive, respectively, to said passed control signals to perform said second function with respect to readback signals only from said record tracks associated with such passed control signals.

6. The subject matter se forth in claim 5 further including error detection and correction means in said signal processing means responsive to said second function to correct readback signals derived in a given manner from said recording media.

7. The subject matter set forth in claim 5 wherein said mode control means in said control means including means indicating a readback mode change, said signal processing means being responsive to said mode change indication to alter its operation to process readback signals in accordance with said mode change.

8. A gating control for magnetic recorder digital signal readback system, said system operable with a plural track record media which yields readback signals via respective sensing transducers with time perturbations, the improvement including in combination:

deskewing means for realigning said readback signals from the respective plural tracks into sets of readback signals;

means associated with said deskewing means for indicating the relative time position of said readback signals from the respective tracks and means indicating time differences between receipt of said respective signals;

means supplying an indication of the magnitude of the difference between the realigned readback signals and the signals currently being received from the respective tracks;

means selectively responsive to said difference indication to supply an actuating signal;

means supplying other signals respectively associated with and derived from readback signals from the respective tracks;

gating means responsive to said actuating signal to selectively pass said other signals; and utilization means receiving said passed signals to perform a function.

9. The subject matter set forth in claim 8 further including mode control means in said utilization means responsive to said passed signals to supply desired mode change indicating signal; and signal processing means for processing said readback signals as received from said deskewing means and being responsive to said mode change indicating signal to alter operation thereof for processing said readback signals in a different manner.

10. The subject matter set forth in claim 9 wherein said signal processing means includes error detection and correction means and having facilities for correcting plural tracks in error; and said other signal means including pointer memory means operatively associated with said error correction means for pointing to tracks in error and including monitor means for monitoring the quality of said readback signals and supplying pointer signals in connection therewith.

11. The method of operating a digital signal recorder readback portion, including the following steps in combination:

scanning plural record tracks for supplying readback signals;

deskewing the readback signals to form parallel sets of signals, one signal in each set from each track up to a maximum skew;

monitoring the deskewing to indicate a given skew condition between said readback signals and generating an actuating signal when skew has a given relationship to but less than maximum skew;

generating control signals, one for each readback signal;

combining the actuating signal with said control signals to selectively generate mode control signals; and changing the deskewing in accordance with the mode control signals while continuing said scanning for processing said readback signals in a mode different from a mode prior to generation of the mode control signals.

12. The method set forth in claim 11 further including the steps of:

detecting and correcting errors in the deskewed signals;

generating said control signals corresponding to plural successive corrections in a readback signal from given tracks; and changing the deskewing by inhibiting transfer of any readback signals from tracks corresponding to parallel control signals even though maximum skew has not been reached.

13. Error control apparatus for a digital signal readback portion of a multitrack recorder which supplies signals from each of several tracks and deskews same up to a maximum allowable skew and performs error corrections on signals from the respective tracks, the improved apparatus including the combination of:

means for memorizing that successive error corrections were made in signals from the respective tracks;

means for indicating that skew between signals from the several tracks are approaching said maximum allowable skew; and means jointly responsive to said means both indicating successive error corrections and approach of said maximum allowable skew to inhibit transfer of said readback signals from those tracks having said successive error corrections for preventing said maximum skew from being exceeded.

14. A control circuit for a digital signal readback portion of a multitrack digital signal recorder having deskewing means capable of deskewing readback signals from several tracks up to an error skew condition, the improved control circuit including the combination:

means detecting and indicating that said error skew condition may be imminent;

means detecting and indicating quality of operation of the readback portion; and means jointly responsive to said indications to supply an actuating signal for effecting a control function over said readback portion.

15. A control circuit for a multichannel digital signal transfer apparatus having deskewing means capable of deskewing digital signals from several channels up to an error skew condition, the improved control circuit including in combination:

means for detecting a given skew less than said error skew between said digital signals and indicating said given skew;

means indicating that a given signal transfer operation is being performed;

means jointly responsive to said given skew and signal transfer indications to perform a control function other than a deskewing operation for adjusting operation of said signal transfer apparatus to eliminate said given skew indication; and means for detecting and indicating said error skew condition.

* * * * *

PO-1050
(5/69)

UNITED STATES PATENT OFFICE
CERTIFICATE OF CORRECTION

Patent No. 3,790,954 Dated March 15, 1974

Inventor(s) Ernest W. Devore; John W. Irwin

It is certified that error appears in the above-identified patent and that said Letters Patent are hereby corrected as shown below:

Column 7, line 29, "puls" should be --plus--.

Column 9, line 62, "and" should be --the--.

Column 10, line 11, "synchronous" should be --asynchronous--.

Column 10, line 20 "of" should be --for--.

Column 11, line 44, "173" should be --273--.

Column 12, line 28, "eight" should be --either--.

Column 15, line 10, "ten-2's" should be --ten-1's--.

Column 16, line 17, "(EOD)" should be --($\overline{EOD}$)--.

Column 17, line 1, "(EOD)" should be --($\overline{EOD}$)--.

Column 20, line 58, after "counting" insert --means--.

Signed and sealed this 9th day of July 1974.

(SEAL)
Attest:

McCOY M. GIBSON, JR.
Attesting Officer

C. MARSHALL DANN
Commissioner of Patents